United States Patent [19]
Glorioso

[11] Patent Number: 4,956,926
[45] Date of Patent: * Sep. 18, 1990

[54] SLUDGE TREATMENT PROCESS

[75] Inventor: John D. Glorioso, Clearwater, Fla.

[73] Assignee: Enviro-Gro Technologies, Baltimore, Md.

[*] Notice: The portion of the term of this patent subsequent to Aug. 9, 2005 has been disclaimed.

[21] Appl. No.: 353,711

[22] Filed: May 18, 1989

Related U.S. Application Data

[62] Division of Ser. No. 232,640, Aug. 8, 1988, Pat. No. 4,829,678.

[51] Int. Cl.$^5$ .............................................. F26B 3/24
[52] U.S. Cl. ......................................... 34/111; 34/17; 34/35; 34/86; 34/102; 34/95; 432/215
[58] Field of Search ................... 34/11, 14, 102, 9, 95, 34/35, 86; 432/196, 215

[56] References Cited

U.S. PATENT DOCUMENTS 4,829,678  5/1989  Glorioso ................................. 34/11

Primary Examiner—Henry A. Bennet

[57] ABSTRACT

A system is described for producing small uniform pellets of predetermined size which are substantially free of fines from mechanically dewatered sewage sludge. The system includes a process and apparatus for mixing the dewatered sludge with previously dried, recycled particles of said sludge, drying said mixture in a thermal drier, separating a substantial portion of the dried solids from the drier off gas, clarifying said separated solids to separate the pellets of predetermined size, oversize pellets, and undersize pellets and particles, mechanically crushing the oversize pellets and admixing the crushed oversize pellets with the undersize pellets and particles, and recycling said mixture by mixing said mixture with incoming dewatered sludge to the drier.

9 Claims, 2 Drawing Sheets

SLUDGE TREATMENT PROCESS

This is a division of U.S. Pat. No. 4,829,678, application Ser. No. 07/232,640, filed 8/8/88.

This invention relates to an improved system for disposing of sewage sludge, and in particular to a system for efficiently drying and pelletizing said sludge for sale as a plant nutrient, soil conditioner, or bulking agent for fertilizer production. The pellets formed are substantially uniform in size and dimensioned to be used in conventional spreaders.

Waste liquid sludge from a sewage treatment plant may contain over 90% water. Conventional disposal techniques include dewatering, drying and disposal in, for example, a land fill. This means of disposal, however, is increasingly becoming not feasible due to environmental regulations and transportation costs.

An alternative, because the sludge contains, when dry, combustible materials, is burning the sludge to produce heat. Normally in such procedures, the sludge is dried in a drier and then burned in a furnace wherein the off gas is passed through a heat exchanger. See, for example, U.S. Pat. No. 4,429,643. In the sludge treated in processes such as that described in the above patent, the wet sludge cake has a moisture content of about 80% as it enters the drier. The moisture is flashed away in the drier and the dried product is pelletized. The off gas from the drier is then mixed with outside air and used as combustion gas in the furnace.

Producing pellets of uniform size has presented a problem in the past. Uniform size pellets are important whether the sludge is to be burned or used as a soil conditioner. In the latter case, uniform size pellets are very important so that the pellets may be used in conventional spreading equipment.

In U.S. Pat. No. 3,963,471 to Quintan L. Hampton, a process is described for producing uniform pellets wherein the wet sludge cake from a mechanical dewatering procedure is mixed with previously dried product pellets and the mixture is then cycled through the drier. It is described that the size of the pellets can be controlled by the amount of material recycled. The recycled pellets then form nucleii for the formation of pellets in the drier as they are surrounded by an adhering layer of wet sludge cake.

In U.S. Pat. No. 4,040,190 there is described a process wherein the recycled materials are all passed through a crusher before being mixed with a wet sludge cake. In that patent it is indicated that the crushing device may be adjusted for controlling the size of the grains to be supplied to the device and that by crushing to a predetermined size the grain size of the output pellets can be controlled. However, this neglects the presence of fines in the recycled product. The entire output from the drier is crushed and then a portion diverted to be recycled with the remaining to storage. Therefore, the product would include fines both from the cyclone separator used for the off gas from the drier, and from the crushing of oversized particles wherein said particles fracture.

It has been discovered, however, that the output particle size can be regulated within desired limits to substantially eliminate fines from the product. According to the system of this invention, the output from the drier is initially separated from the fines and routed to a rotary screen. The rotary screen then separates the oversized pellets from the regular sized pellets, and the latter from the fines. The airstream containing fines then passes through a cyclone system for removing the fines, and fines from the cyclone system and from the rotary screen are combined in a recycle bin. The product size pellets are then routed to a product bin for sale as a fertilizer, soil conditioner, or the like. Finally, the oversized pellets are crushed and routed to the recycle bin. In this way, product size pellets which may be preferably 4 to 5 millimeters in diameter can be provided for sale, use as a fuel or the like substantially without fines. The system also provides for a deodorizing treatment of the airstream from the cyclone separator before emission into the atmosphere. This treatment may include a wet scrubber, a chemical tower, and the like. Any liquid from this treatment is routed back to the head of the plant and added to incoming liquid sludge.

The drier may be heated with conventional means such as oil, natural gas or a wood burner or other suitable fuel may be used to supplement fossil fuel. If desired, the dried sludge may be used as a source of fuel.

Accordingly, it is an object of this invention to provide a system for pelletizing sewage sludge to produce pellets of uniform size useful as a soil conditioner, fertilizer, fuel or the like.

It is another object of this invention to provide a system wherein dewatered wet sludge cake is combined with recycled dried sludge pellets and pelletized in a rotary drier, with the output from said drier being screened to separate product size pellets from oversized pellets which are crushed and from fines whereby the crushed oversize pellets and fines are recycled to be admixed with the dewatered sludge cake.

It is yet another object of this invention to provide a system wherein the output dried sludge pellets exiting a drier are initially subjected to a lower velocity centrifugal separation from the airstream and then screened to separate oversized, product sized, and fines. Oversized pellets are then crushed and admixed with the fines for recycling as input to the drier with dewatered sludge cake.

These and other objects will become readily apparent with reference to the drawings and following description wherein.

Figure 1:
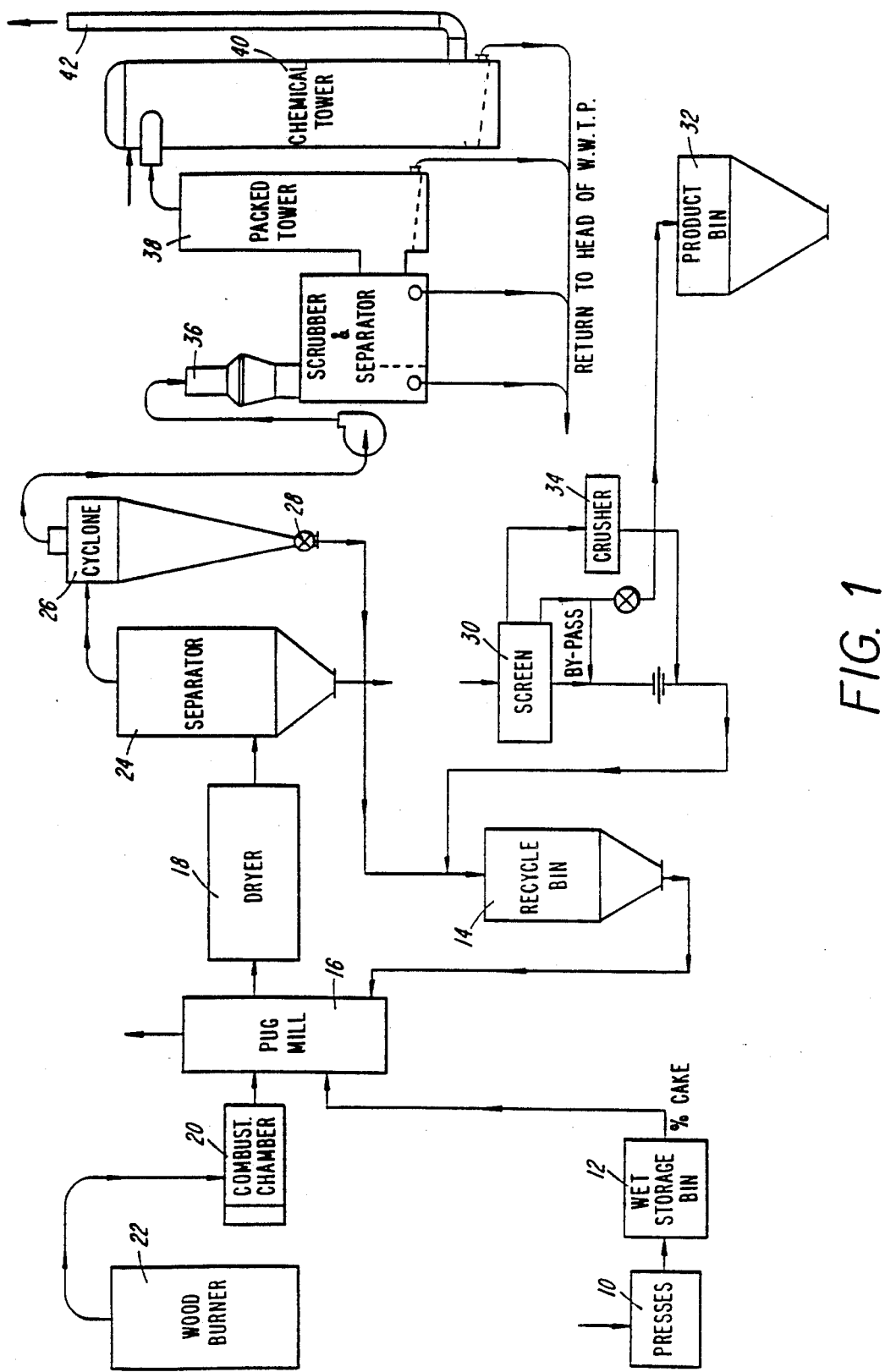
FIG. 1 is a schematic of the system of this invention.

With attention to the drawings and to FIG. 1 in particular, liquid sewage sludge may contain up to 90 to 99% water. According to conventional techniques, the sludge is subjected to flocculation whereby the sludge particles agglomerate so that when the liquid sewage sludge enters a mechanical press 10 it can be dewatered down to about 80% water and then routed to a storage bin 12. The material from bin 12 will be identified hereinafter as wet sludge cake. As noted, this material contains about 80% water.

Wet sludge cake from the storage bin 12 and recycled dried sludge from the recycle bin 14 are then routed by conventional conveyor to a mixing pug mill 16. In one embodiment of this invention two pug mills are used with a 90° turn. It should be noted that while the material from the recycle bin and the wet sludge cake can individually be conveyed by auger or the like, the mixture in the pug mill cannot. Accordingly, as soon as the product is mixed in the pug mill 16, it enters the drier 18 wherein heat is supplied by a conventional furnace 20 or the like. In the embodiment shown, the heat from furnace 20 is supplemented by a solid fuel burner 22 which may burn wood chips or the like. In the alternative, burner 22 could be fueled with sludge pellets and/or the combustion chamber 20 could be fueled with sludge pellets.

Drier 18 is preferably a triple pass rotary drier heated at the entrance to around 800° F. The mixture is intended to travel the length of the drier, make a 180° turn and travel the length two more times before exiting the drier. While several different types of rotary driers could be utilized, it is preferable to use the rotary drier described in U.S. Pat. No. 4,558,525.

Pelletized sludge, together with the drier off gases, exit the drier 18 and enter a separator can 24. The temperature of this stream is about 180° F.

The separator can 24 is a vertically disposed cyclone-type separator that uses gravity and centrifugal force to remove about 85 to 90% of the solids from the gas stream. The gas stream then exits the separator into a cyclone 26 where the fines are removed and the fines then exit cyclone 26 at exit port 28 and are added to the recycle bin 14.

Cyclone 26 could be a conventional cyclone system, but it is preferred to use the separator described in U.S. Pat. No. 4,357,152 for more efficient removal of the solids from the gas stream. Solids from separator 24 then enter screen system 30. Preferably, screen system 30 is a rotary screen which also acts as a cooler. In the preferred embodiment of this invention, ⅛ inch and 3/32 screens are provided. Material larger in diameter than ⅛ inch is classified as oversize. Particles in diameter between ⅛ inch and 3/32 inch are the product and are routed to a product bin 32. The oversize particles are then routed to a conventional crusher 34 which may be a roller or the like. The crushed particles are then routed to the recycle bin 14. The fines passing through the 3/32 inch screen then exit the screen and are also routed to the recycle bin. As shown in FIG. 1, in the event of a need for more recycle material, product may bypass the product bin and be routed to the recycle bin.

Finally, the airstream exhausted from cyclone 26 passes preferably through a scrubber 36, a packed tower 38, and a chemical tower 40 before being exhausted to the atmosphere through stack 42. This procedure will eliminate any solids remaining beyond that permitted by air pollution regulations as well as any noxious odors. The liquid from the air treatment system 36, 38, 40 and 42 is then returned to the head of the waste water treatment plant to be combined with the liquid sludge being admitted to press 10 for recycling.

During normal operation the product pellets have an optimum size of about 4 to 5 millimeters and constitute about 10% of the solids passing through the system.

As previously indicated, the entrance temperature at the rotary drier is about 800° F. The temperature of the airstream exiting the drier is about 180° F. After cooling in the rotary cooler screen system 30, the recycle materials in the recycle bin are at a temperature of about 140° F.

Figure 2:
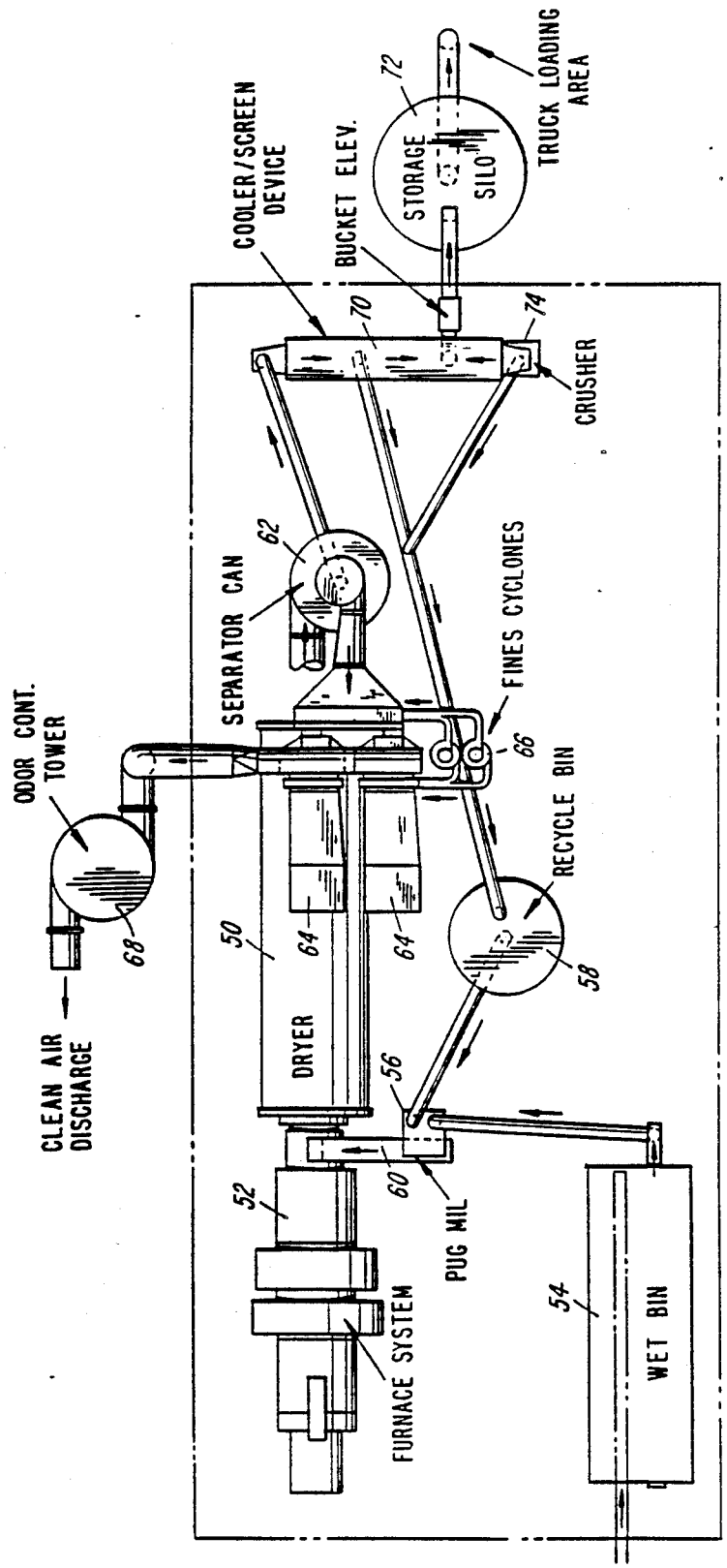
FIG. 2 is a schematic of a preferred version of the system of this invention.

With attention to FIG. 2, FIG. 2 represents a slight modification of the system of FIG. 1. The source of heat for drier 50 is a conventional furnace system 52 which utilizes a conventional fuel such as oil. Wet sludge cake from a storage bin 54 is routed to a first pug mill 56 where the wet cake is mixed with dried pellets from the recycle bin 58. The mixture from mill 56 then drops into a second pug mill 60 and makes a 90° turn as shown to promote mixing.

The mixture then enters drier 50 in front of the outlet from furnace 52. Drier 50 is preferably a triple pass drier as described above and shown in U.S. Pat. No. 4,558,525. After passing through the drier the stream including solids enters separator can 62. As described above, separator can 62 is a low velocity cyclone type separator. A commercial version may be obtained from Progressive Development Incorporated of Milwaukee, Wis. The air and fines from separator can 62 then enter either a pair or a single cyclone type separator 64 which are preferably the devices described and claimed in U.S. Pat. No. 4,357,152. The fines from the cyclone 64 are routed from additional cyclone separator(s) 66 to the recycle bin and the airstream returned to cyclone 64. The airstream exiting cyclone 64 then is treated in an odor controlling tower 68, which may be of conventional design, before the air is exhausted to the atmosphere.

The solids from separator can 62 then are routed to a cooler screening device 70. Preferably as described there are two screens in the cooler separator device. The first screen in this version separates out particles less than 3/32 inch in diameter and these particles are routed directly to the recycle bin 58 as shown. The second screen separates the product which has preferably a diameter of between ⅛ inch and 3/32 inch and that product is routed to storage 72 for eventual sale.

The oversize particles remaining then enter crusher 74 and are eventually rerouted to the recycle bin 58 for recycling through pug mills 56 and 60 to drier 50, with wet sludge cake.

In summary, the system of this invention provides a means for eliminating fines and undersized material from a product so that dried pelletized sewage sludge may be marketed in truly uniform pellet sizes. In addition, by crushing only the oversized particles, and by recycling the crushed material, the size of the product formed can be strictly regulated. The system of this invention also obviates the need for passing fines and product size pellets through a crusher wherein even the product size pellets could be crushed against each other. The system of this invention combines a low velocity separator which removes up to about 85-90% of the solids exiting the drier and a screen device for solids separation so that the smaller particles and oversized particles after crushing can be recycled.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. A process for drying mechanically dewatered sewage sludge to produce pellets of a predetermined small and uniform size comprising the steps of:

providing a first and a second pug mill, each having an inlet and an outlet, said second pug mill being disposed below said first pug mill and at about a 90° angle thereto;

mixing said sludge with recycled, previously dried sludge particles and pellets in said first pug mill; dropping said mixture into said second pug mill; mixing said material further in said second pug mill;

providing a rotary dryer having a inlet and an outlet, the inlet being disposed adjacent the outlet from said second pug mill; dropping said mixture from said second pug mill into the inlet of said rotary dryer and drying said mixture to form pellets and particles thereof;

conveying the dried pellets and particles and drier off gas to a low velocity gas/solids separator and separating and collecting the pellets and a substantial portion of the particles;

clarifying the collected pellets and particles and separating and collecting pellets of a predetermined size, the undersize pellets and particles and oversize pellets constituting recycle material;

mechanically crushing the recycle materials and collecting the crushed pellets and undersize particles and pellets; and recycling the collected undersize pellets and particles by mixing said recycle materials with said incoming sludge in said first pug mill.

2. The process of claim 1 wherein the step of clarifying further includes providing a first screen which will pass pellets and particles therethrough of a predetermined size or smaller and providing a second screen which will pass only pellets and particles smaller than the predetermined size whereby the pellets of a predetermined size may be collected as product.

3. The process of claim 2 wherein the step of mechanically crushing includes mechanically crushing only the oversize pellets retained on said first screen.

4. The process of claim 1 wherein said drier is a triple pass rotary drier.

5. The process of claim 4 wherein the step of clarifying further comprises cooling said collected pellets and particles.

6. An apparatus for drying dewatered sewage sludge to produce pellets of a predetermined small and uniform size comprising:

means for mixing said sludge with recycled, previously dried sludge particles and pellets including first and second pug mills, each having an inlet and an outlet said second pug mill being disposed below said first pug mill and substantially at a 90° angle thereto;

rotary thermal drying means downstream of said second pug mill for receiving said mixture and drying said mixture to form pellets and particles thereof;

gas/solids separator means downstream of said drying means for receiving the dried pellets and particles and off gas from said dryer and separating a substantial portion of said pellets and particles from said off gas;

clarifying means downstream of said separator for receiving said separated pellets and particles and for separating therefrom the pellets and particles of a predetermined size, the remainder constituting recycle materials;

mechanical crushing means downstream of said clarifying means for receiving and mechanically crushing said recycle materials; and storage bin means and conveying means for conveying the crushed recycle materials to the storage bin means whereby the contents thereof may be recycled by mixing the same with incoming dewatered sludge to be admitted to said first pug mill and from said first pug mill to said second pug mill and from there into said drying means.

7. The apparatus of claim 6 wherein the clarifying means comprises a first screen for separating pellets above a predetermined size and a second screen for retaining pellets of said predetermined size; means for conveying the pellets retained on the first screen to the mechanical crushing means.

8. The apparatus of claim 7 wherein said clarifying means further comprises means for cooling the pellets and particles.

9. The apparatus of claim 8 wherein said drying means includes a rotary triple pass dryer.

* * * * *